June 20, 1939.  W. H. PARMENTER  2,162,821
FISHLINE BOBBER
Filed Feb. 7, 1938
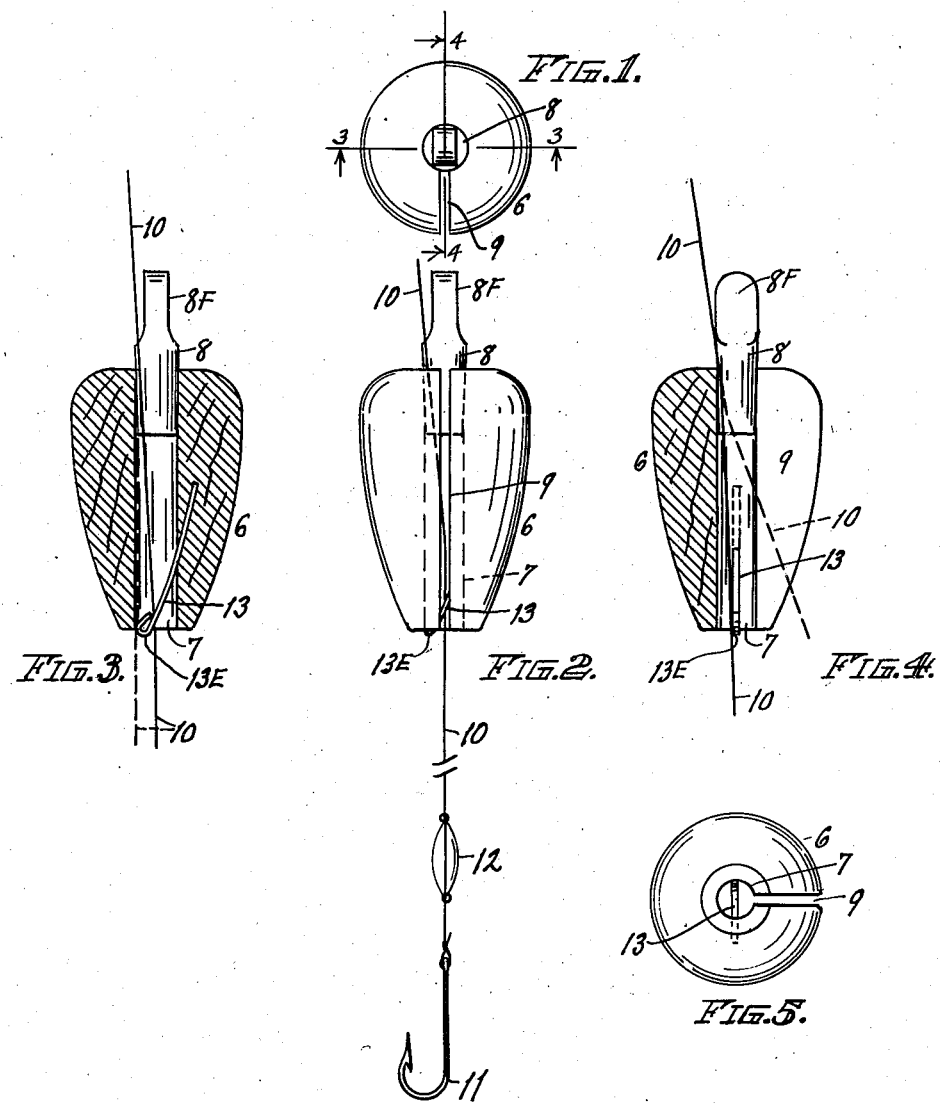

Patented June 20, 1939

2,162,821

UNITED STATES PATENT OFFICE 2,162,821

FISHLINE BOBBER

Walter H. Parmenter, St. Paul, Minn.

Application February 7, 1938, Serial No. 189,060

3 Claims. (Cl. 43—49)

My invention relates to a fish line float of the kind commonly designated as bobbers and the main object is to provide a float of improved simple construction, of high efficiency to enable placement of the float on a line with relation to the fish hook to vary the depth of the latter in the water for suspending bait as may be deemed necessary.

The objects of my invention are accomplished and consist essentially of the new and simple construction, arrangement of parts and combination thereof, as hereinafter fully described and claimed and as illustrated in the accompanying drawing, in which;—

Fig. 1 is a top end view of my improved bobber and Fig. 2 is a front elevation showing additionally a fish line retained in the bobber in certain predetermined relation to the fish hook at the lower extremity of the line.

Fig. 3 is a longitudinal sectional elevation of the bobber as on line 3—3 in Fig. 1 and Fig. 4 is a like elevation on a plane at right angles to the Fig. 3 section, as on line 4—4 in Fig. 1.

Fig. 5 is a bottom end view of the bobber.

Referring to the drawing by reference numerals, like characters designating corresponding parts in the various views, 6 designates the float member or bob of my device and comprising an elongated body of any desired shape or configuration and formed preferably of wood, as shown, or other suitably buoyant material. 7 is a longitudinal central bore in the bob normally closed at its upper end by a tapered, removable plug 8 also preferably made of wood and its upper exposed end preferably flattened, as at 8F, to provide convenient finger hold.

9 is a longitudinal, radial slit in the bob for the purpose of inserting a fish line 10 into the bore 7 in which the said line is slidable freely when the plug 8 is removed. When the fish hook 11 and its weight 12 are in desired spaced relation to the bob 6 the plug 8 is inserted in bore 7 frictionally engaging and holding the line 10 within the bore.

13 is a spring metal arm longitudinal of and within bore 7 extending in inclined plane, diametrically of bore 7 and its inner and upper end imbedded and retained in the bobber (see Figs. 3 and 4) upwardly of the lower end of the bore. The lower end of said arm preferably is formed with an elongated eye 13E and which bears against the opposite wall of the bore from the side thereof in which the arm is retained. The arm traverses the bore in an inclined plane at right angles to the plane of the slit 9 and said eye part 13E is at the lower end of the bore 7 (see Fig. 3).

In the use of my improved fish line bobber the fishing line 10 is let into the slit 9 and into the bore 7, assuming that plug 8 has been first removed, the weighted and hook end of the line extending below the bottom of the bobber according to how deep the operator wants to suspend the bait in the water. First entry of the line 10 as described brings it against one side of the yieldable arm 13. To cause the float to be connected to the line the latter is simply pressed under the eye 13E which yields and the line is then in the bore 7 back of the spring arm 13 or in other words the line is then in that part of the bore 7 opposite from the slit 9 and although the line is loose and slidable freely within the float it cannot come out under ordinary conditions. The plug 8 is then inserted in the top end of bore 7 squeezing and holding the line therebetween and the hook 11 is retained in fixed relation to the float.

While the line is thus held within the bore 7 the plug 8 may be removed and the float moved on the line to any position desired and according to how deep it is desired to have the hook in the water.

Obviously it is a simple matter to remove the line from the float by merely pressing the line under the headed part 13E and past the latter toward the slit 9 through which the line can then be readily removed, said releasing movement being as from left (full line) position of line 10 in lower part of Fig. 4 and removal of line to the right through slit 9 as designated by dotted line 10 in the same figure.

Any equivalent of the member 13 and its eye 13E yieldably contacting a side of the bore 7 at an angle with relation to slit 9 may be used. Said member 13 as shown and described is preferably of spring wire and is easily firmly seated in the float, its yieldable head part 13E preferably located at or near the lower terminus of the bore 7.

The entire device may be suitably treated to prevent it becoming water soaked and too heavy for use as a float. The exterior areas may be suitably finished in one or more colors, plain or in various designs, a bright red being most desirable because it is most readily seen by the angler during usual daylight fishing and even during twilight.

Modifications within the scope and spirit of my invention may be embodied and as set forth in the following claims.

I claim:

1. A fish line float comprising an elongated body of buoyant material and provided with a central longitudinal bore and a slit extending radially therefrom, a tapered plug member removably insertible and frictionally seated downwardly in the upper end of said bore, and a fishline guiding and retaining member in the lower end of said bore and fixed in a plane at an angle relative to the said slit, said retaining member being fixed in the float inwardly of the lower end of the latter thence traversing the bore longitudinally and in an inclined position and its lower end part yieldably bearing against the opposite wall of the bore.

2. The structure specified in claim 1, in which said lower terminus of the retaining member is formed with a bent portion yieldably bearing edgewise against the side of the bore at the lower, open end of said bore.

3. A fish line float comprising an elongated body of buoyant material and provided with a central straight bore and a slit the entire length of said float extending radially from said bore, a plug member removably insertible and frictionally retainable in the upper end part of said bore, and a fish line guiding and retaining member in the lower part of said bore and fixed in a plane at right angle relative to the plane of said slit, said retaining member being fixed in the float inwardly of the lower end of the latter, thence traversing the bore diametrically and in an incline, the lower terminus of the member bearing yieldably against the opposite wall of the bore from its fixed end, substantially as shown and described.

WALTER H. PARMENTER.